United States Patent [19]

Kaplan

[11] Patent Number: 5,163,087
[45] Date of Patent: Nov. 10, 1992

[54] DELIVERY OF CUSTOMER DATA BASE KEY USING AUTOMATIC NUMBER IDENTIFICATION

[75] Inventor: Marc P. Kaplan, Aberdeen, N.J.
[73] Assignee: AT&T Bell Laboratories, Murray Hill, N.J.
[21] Appl. No.: 636,345
[22] Filed: Dec. 31, 1990
[51] Int. Cl.⁵ .......................................... H04M 11/00
[52] U.S. Cl. ..................................... 379/94; 379/142; 379/201
[58] Field of Search ................ 379/142, 245, 246, 95, 379/127, 201, 207, 94, 97, 96

[56] References Cited

U.S. PATENT DOCUMENTS

| | | | |
|---|---|---|---|
| 4,656,623 | 4/1987 | Dalby, Jr. et al. | 379/96 |
| 4,757,267 | 7/1988 | Riskin | 379/113 |
| 4,797,911 | 1/1989 | Szlam et al. | 379/246 |
| 4,797,913 | 1/1989 | Kaplan et al. | 379/91 |
| 4,852,154 | 7/1989 | Lewis et al. | 379/246 |
| 4,853,955 | 8/1989 | Thorn et al. | 379/142 |
| 4,897,867 | 1/1990 | Foster et al. | 379/94 |
| 4,987,587 | 1/1991 | Jolissaint | 379/94 |
| 4,994,797 | 2/1991 | Breeden | 379/142 |
| 5,003,595 | 3/1991 | Collins et al. | 379/95 |
| 5,046,088 | 9/1991 | Margulies | 379/201 |

OTHER PUBLICATIONS

K. G. Hegebarth, "ANI is the key to unlock Advanced network services", Telephony, Nov. 14, 1988, pp. 64, 66, 68.
The Bell system Technical Journal vols. 56, Nos. 2 and 7; vol. 57, No. 2; vol. 60, No. 6; vol. 61, No. 7; and vol. 64, No. 6, part 2; table of contents pages only.
AT&T Technical Journal, vol. 66, Iss. 3, May—Jun. 1987, "ISDN Architecture," R. T. Roca, pp. 5—17; ISDN Standards Evolution, Hrair Aldermeshlan, pp. 19-25; AT&T Communications ISDN Architechture, M. L. Higdon, et al., pp. 27—33.
AT&T Technical Journal vol. 65, Iss 1, Jan.-Feb. 1986, "AT&T Network Architecture Evolution," J. L. Cummings, et al. pp. 2—11; Common Channel Signaling Network Evolution, J. J. Lawser, et al. pp. 13-20.
American National Standards Institute (ANSI) T1.114 through T1.115, article describing Signaling System Number 7 (SS7).
AT&T Networks ISDN Primary Rate Interface Specification, Technical Reference 41449, Apr. 1989.
AT&T Networks ISDN Primary Rate Interface and Special Applications Specification, Technical Reference 41459, Apr. 1989.
AT&T Technology Report, vols. 2 and 3, 1988, article on 3B Computers.
K. G. Hegebarth, "ANI is the key to unlock advanced network services", Telephony, Nov. 14, 1988, pp. 64,66,68.

Primary Examiner—James L. Dwyer
Assistant Examiner—Wing F. Chan
Attorney, Agent, or Firm—Ronald D. Slusky

[57] ABSTRACT

An enhanced "800" service translates an Automatic Number Identification (ANI) of a calling party into a customer data base key defined by the called party. The customer data base key is then provided by the enhanced "800" service to the called party in place of the ANI information.

15 Claims, 4 Drawing Sheets

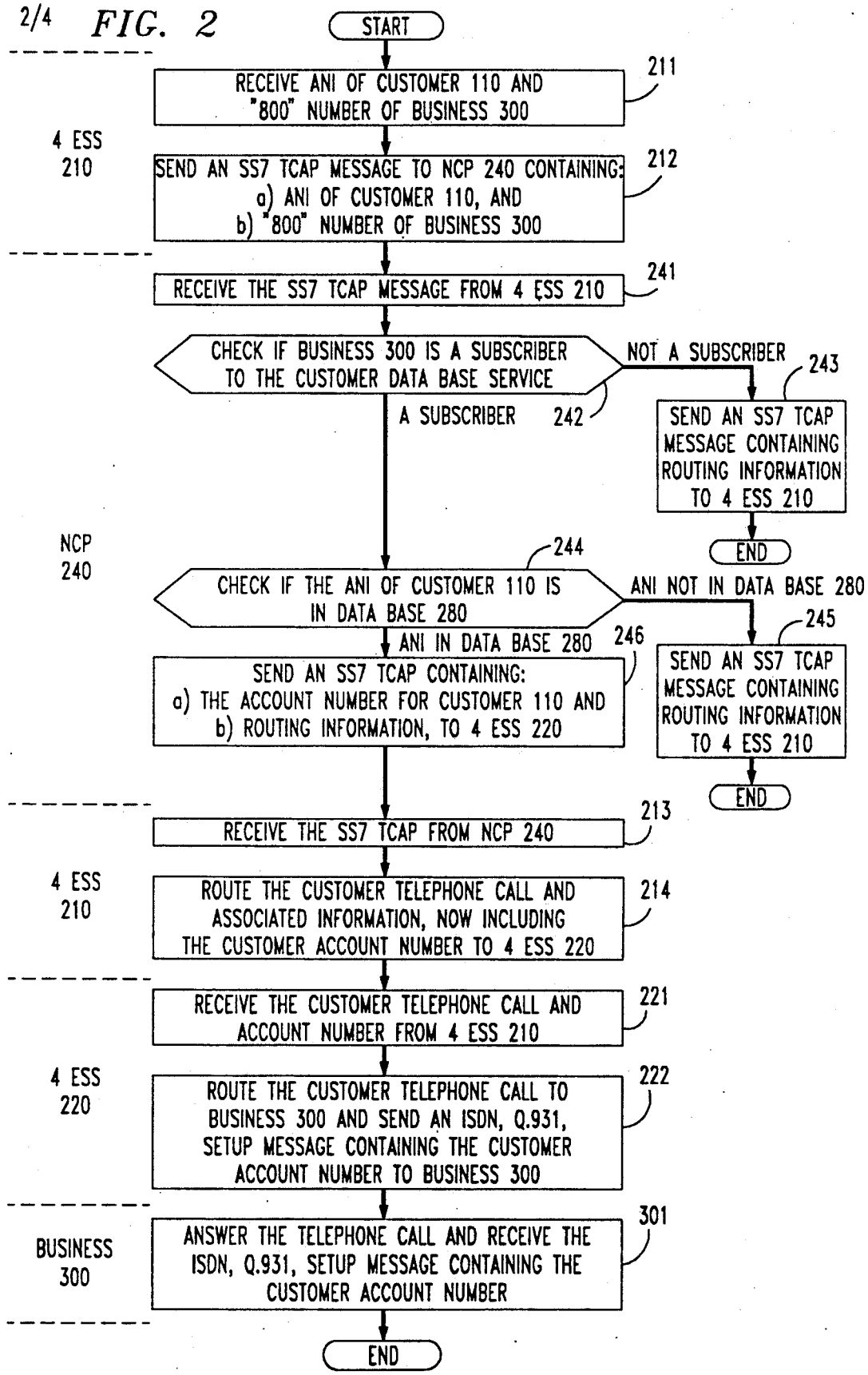

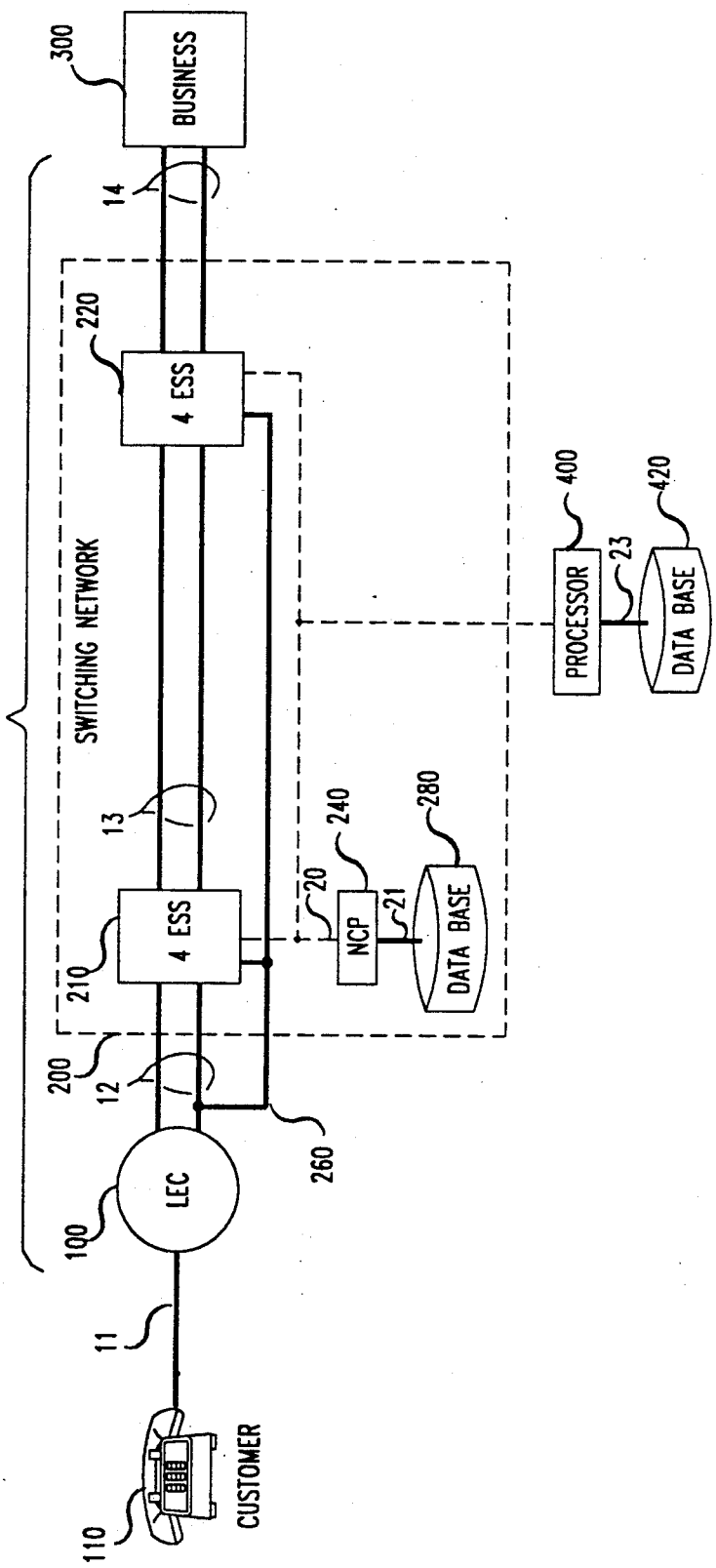

DELIVERY OF CUSTOMER DATA BASE KEY USING AUTOMATIC NUMBER IDENTIFICATION

BACKGROUND OF THE INVENTION

The present invention relates to telecommunications systems and particularly to toll-free, or "800", telecommunications networks.

In today's marketplace, almost every business can offer to sell a product or service to a customer through a telephone call, between the business and the customer, rather than require the customer to physically be present at a location of the business. In fact, some businesses may rely on this type of customer contact to provide significant revenue to the business. As a result, such a business may invest in an on-premise telephone system such as an "in-bound telemarketing system" which is tailored to facilitate contact between the business and the customer through a telephone call.

In an in-bound telemarketing system, the business typically subscribes to an "800" service provided by a telecommunications network where a customer can call the business toll-free, i.e., at no-cost to the customer. However, even though the "800" service may encourage the customer to contact the business to buy a product or service, the "800" service is only one part of an in-bound telemarketing system. Another part of such a system is the "call-receipt system," i.e., how the business actually answers and processes the customer telephone call. At a minimum, usually, an agent (i.e., an employee) of the business will answer and process the customer telephone call, e.g., collects customer information such as an account number, address, etc.. Typically, in an in-bound telemarketing system, the time for an agent to process a customer's telephone call affects the overall performance of the in-bound telemarketing system. For example, if the time for an agent to collect customer information is long, the business may have to employ more agents and subscribe to more telecommunications facilities (i.e., telephone lines) in order to be able to answer, in a timely manner, telephone calls from other customers. As a result, in order to more efficiently process the customer's telephone call, the business may provide an agent with additional support equipment, such as a computer system, to facilitate the agent's job. The business's computer system can be used to record customer information in a data base and to provide billing and ordering information. Consequently, the agent is supplied with a computer terminal so that the agent, after entering the customer name via the computer terminal, can obtain and display relevant customer information, e.g., the customer's address, from the data base thereby reducing the need for the agent to spend the time collecting such information from the customer.

In addition, the business can take advantage of another call processing technique to further reduce the amount of time spent by an agent in processing a customer telephone call and thereby improve the overall call-receipt efficiency of the in-bound telemarketing system. Specifically, the business can take advantage of an ability of the telecommunications network to provide the Automatic Number Identification (ANI) of the customer (i.e., the calling party) when the customer's telephone call is answered by an agent of the business. As a result, the business's computer system can process, or translate, the ANI of the calling customer into a form that is compatible with the business's data base so that relevant customer information is simultaneously provided to the agent answering the telephone call from the customer (e.g., such customer information as an account number, address, etc.) without the agent having to ask the customer for his or her name.

SUMMARY OF THE INVENTION

Currently, as mentioned above, a telecommunications network can provide an Automatic Number Identification (ANI) of the calling party (e.g., a customer), to a called party (e.g., a business). However, I have realized that this information, while being of some value to the business, is not, necessarily, in the most advantageous form to the business. For example, the business, upon receiving the ANI of the customer, must translate the ANI into a form that is compatible with the particular computer system being used by the business. In addition, when a customer moves, i.e., changes his or her residence, the customer's ANI changes, which requires the business to update, i.e., administer and maintain, the ANI information pertaining to that customer. Further, some consumer groups across the country view the wide-spread dissemination of ANI information by a telecommunications network as an invasion of an individual's privacy, since the ANI is usually the same as the telephone number of the calling customer (this is especially true in a residential setting).

In accordance with the invention, the above and other problems are overcome by translating an associated telephone number of the calling party within the telecommunications network into a customer data base key which is then provided to the called party.

In accordance with a feature of the invention, the associated telephone number of the calling party is an Automatic Number Identification (ANI) of the calling party.

In accordance with another feature of the invention, the customer data base key may be a customer account number specified by the business. The account number would be compatible with the business's call-receipt system so that no conversion of the information would be necessary by the business. Also, since the account number doesn't change when a customer moves, the administration and maintenance requirements associated with the ANI information would be eliminated for the business. Further, by only providing the account number, the privacy of the customer is protected, i.e., the business does not necessarily have to receive the customer's ANI (which is usually the telephone number of the customer if the customer is calling from his or her residence).

In a preferred embodiment, the AT&T MEGA-COM ®800 (M800) Service is enhanced to translate the ANI of a calling customer (i.e., the calling party) into a customer data base key which is then provided to a business (i.e., the called party). Specifically, a business subscribes to the M800 service which allows a customer to call, at no-charge, the business to inquire about a product or service. The M800 service is provided to the business through a Primary Rate Interface (PRI) Integrated Services Digital Network (ISDN) telecommunications facility. In order to inquire about product or service information, the customer dials the "800" number, associated with the business, using a telephone set (rotary or touch-tone). When the customer dials the telephone number of the business, the M800 service translates the customer's ANI in conjunction with the dialed telephone number to provide a customer data base key for the business. When the customer's telephone call is answered by the business, the M800 service provides the customer data base key to the business.

BRIEF DESCRIPTION OF THE DRAWING

In the drawing,

FIG. 2 is a flow diagram of process steps carried out in the communications system of FIG. 1 to implement the invention;

FIG. 3 illustrates a general format for an SS7 TCAP message;

FIG. 4 is a block diagram of another illustrative communications system in which the present invention is implemented.

DETAILED DESCRIPTION

As noted earlier, a telecommunications network can provide an Automatic Number Identification (ANI) of a calling party (e.g., a customer), to a called party (e.g., a business). However this information, while being of some value to the business, is not necessarily in the most advantageous form to the business. For example, the business, upon receiving the ANI of the customer, must translate the ANI into a form that is compatible with the particular computer system being used by the business. In addition, when a customer moves, i.e., changes his or her residence, the customer's ANI changes, which requires the business to update, i.e., administer and maintain, the ANI information pertaining to that customer. Further, some consumer groups across the country view the wide-spread dissemination of ANI information by a telecommunications network as an invasion of an individual's privacy since the ANI is usually the same as the telephone number of the calling customer (this is especially true in a customer residential setting).

In accordance with the invention, the above and other problems are overcome by translating an associated telephone number of the calling party within the telecommunications network into a customer data base key which is then provided to the called party.

In accordance with a feature of the invention, the associated telephone number of the calling party is an Automatic Number Identification (ANI) of the calling party.

In accordance with another feature of the invention, and described in the illustrative embodiment below, the customer data base key may be a customer account number specified by the business. The account number would be compatible with the business's call-receipt system so that no conversion of the information would be necessary by the business. Also, since the account number does not change when a customer moves, the administration and maintenance requirements associated with the ANI information would be eliminated for the business. Further, the account number can be chosen so as to be less intrusive into a customer's privacy, i.e., it is not the telephone number of a calling party.

Figure 1:
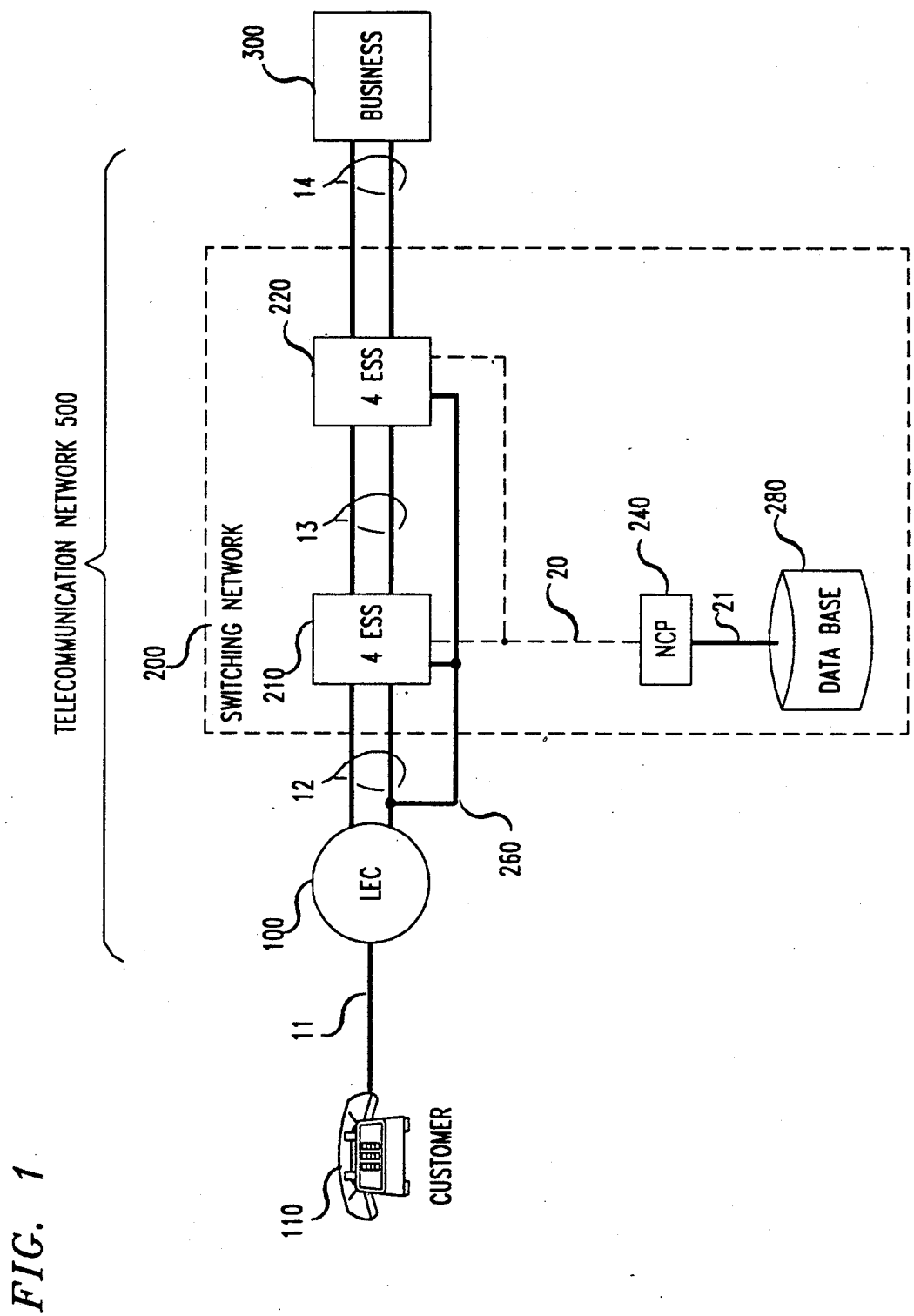
FIG. 1 is a block diagram of an illustrative communications system in which the present invention is implemented.

A representative communications system, in which the invention can be implemented, is shown in FIG. 1.

It is assumed, for illustrative purposes only, that business 300 subscribes to an "800" telecommunications service such as the MEGACOM 800 (M800) service from AT&T. The M800 service is provided by switching network 200 and allows a customer at customer terminal 110 to dial business 300, at no charge (toll-free), to place an order, or even request a service, from the convenience of his or her residence or office. The communications system of FIG. 1 is comprised of well-known technologies, and references to relevant illustrative technical material are included hereinbelow. In addition, it is assumed the nomenclature of a "telephone call" is understood to represent any of the well-known methods, processes and technologies used in telecommunications for supporting a voice, or data, communication between a starting point—the calling party—and a destination point—the called party.

Customer terminal 110 represents one of a plurality of customers. For the purposes of this example, customer terminal 110 is a "touch-tone" telephone. (A "rotary" telephone can also be used.) Customer terminal 110 is connected to local exchange carrier (LEC) 100, of telecommunications network 500, via representative analog line facility 11 (e.g., a loop supervision trunk). LEC 100 is representative of one of a plurality of local exchange carriers that are served by switching network 200 and is typically comprised of stored-program-control switching system technology. Stored-program-control switching technology is generally described in *The Bell System Technical Journal*, Vol. 56, No. 2, February, 1977, and Vol. 64, No. 6, Part 2, July-August, 1987. LEC 100 is connected through path 12 to switching network 200. Path 12 is representative of well-known network access facilities, such as trunks and other stored-program-control switches through which a telephone call is routed to switching network 200. Switching network 200 is, illustratively, comprised of a plurality of stored-program-control switching systems, herein represented by 4 ESS ™ digital switches 210 and 220 available from AT&T. The 4 ESS digital switch is described in detail in *The Bell System Technical Journal*, Vol. 56, No. 7 September, 1977, and Vol. 60, No. 6, Part 2, July-August, 1981. For the purposes of this example, 4 ESS switching systems 210 and 220 are representative of the originating and terminating points, respectively, of switching network 200. (Examples of network architecture can be found in the *AT&T Technical Journal*, Vol. 66, Iss. 3, May-June, 1987.) An illustrative telephone call will enter switching network 200 through switch 210, the originating point of the telephone call in switching network 200. Switch 210 will access network control point (NCP) 240 in a well-known way for routing information in order to route the telephone call to terminating switch 220 through path 13. NCP 240 is representative of a general purpose computer, and its function as a network control point is described in U.S. Pat. No. 4,191,860, issued Mar. 4, 1980, to Weber. Path 13 may include other network stored-program-control switches and represents typical network interconnecting trunk facilities through which an illustrative telephone call may be routed. Switching network 200 serves a plurality of businesses such as business 300. Business 300 is connected to 4 ESS switch 220 over trunk facility 14, illustratively, a "Primary Rate Interface" (PRI) Integrated Services Digital Network (ISDN) facility. ISDN technology is described in the *AT&T Technical Journal*, Vol. 66, Iss. 3, May-June, 1987, and Vol. 65, Iss. 1, January-February, 1986.

Trunk facility 14 represents the number of PRI ISDN trunks subscribed to by business 300. As is known in the art, each PRI ISDN trunk typically consists of 23 lines, or "B-channels", that are available to business 300 for use in sending and receiving information. In addition, each trunk also consists of a "D-channel" which is used for send signalling and control data in order to manage the information carried by each of the respective 23 B-channels.

In order to provide the ability to route an illustrative telephone call from customer terminal 110 to business 300, telecommunications network 500 of FIG. 1 also includes well-known Common Channel Signaling (CCS) network 260 for transferring control information such as billing, routing, and supervisory information messages between the representative stored-program-control switching systems shown in FIG. 1. A typical CCS network is described in *The Bell System Technical Journal*, Vol. 57, No. 2, February, 1978, and Vol. 61, No. 7, September, 1982, and in the *AT&T Technical Journal*, Vol. 66, Iss. 3, May–June 1987, and, Vol. 65, Iss. 1, January–February, 1986. For the purposes of this example, it is assumed that CCS network 260 conforms to the standards for Signalling System number 7 (SS7) as described in *American National Standards Institute* (ANSI) *T1.114 through T1.115*. In addition, it is assumed that all ISDN equipment utilizes the well-known ISDN Q.931 protocol, and supports ISDN applications as defined in *AT&T Networks ISDN Primary Rate Interface Specification*, Technical Reference 41449, April, 1989, and *AT&T Networks ISDN Primary Rate Interface and Special Applications Specification*, Technical Reference 41459, April, 1989. Finally, it is assumed that the switching system, and interconnecting trunk facilities, can supply the well-known Automatic Number Identification (ANI) of the calling party in order to establish the location of the calling party in telecommunications network 500, i.e., the calling party's network address. A telephone signaling protocol for supplying ANI from a LEC to a network switching system is described in U.S. Pat. No. 4,555,594, issued Nov. 26, 1985, to Friedes et al.

In order to facilitate understanding of the inventive concept, reference is now made to FIG. 2 which represents a flow diagram of illustrative process steps carried out in the communication system of FIG. 1. The service disclosed herein, in accordance with the principles of the invention, will be termed the "customer data base key service". A customer at customer terminal 110 originates a typical "800" telephone call by dialing a predetermined "800" number which corresponds to business 300. The telephone call and associated information, e.g., the calling party's ANI and the called party's number (i.e., the dialed "800" number), are then routed through telecommunications network 500 to 4 ESS 210 (block 211). Upon receiving the telephone call and associated information, 4 ESS 210 sends an SS7 TCAP message (e.g., see *ANSI T1.114 Transaction Capability Application Part* (TCAP)) to NCP containing: a) the ANI of customer 110, and b) the "800" number of business 300 (block 212). (FIG. 3 illustrates a typical format for an SS7 TCAP message. Illustratively, the various fields in the SS7 TCAP message are used to convey information for the customer data base key service. For example, the ANI of customer 110 and the "800" number of business 300 are included in the operation parameter field.)

NCP 240 receives the SS7 TCAP message from 4 ESS 210 (block 241). NCP 240 is connected to data base 280 which contains in this example, not only routing information for "800" telephone calls, but also the following information:
 a) a list of all "800" numbers at associated businesses which subscribe to the customer data base key service;
 b) for a particular "800" number, a list of all ANIs of associated customers;
 c) for a particular ANI, the associated account number as specified by the business.

For the purposes of this example, it is assumed this collection of information in data base 280 already exists (a description of how to create this data base is described hereinbelow). NCP 240 checks the "800" number with the information in data base 280, to determine if business 300 is a subscriber to the customer data base key service (block 242). (An example of called party specific processing in an NCP can be found in U.S. Pat. No. 4,611,094, issued Sep. 9, 1986, to Asmuth et al.) If business 300 is not a subscriber to the service, NCP 240 sends an SS7 TCAP message containing routing information for the "800" telephone call, as in the prior art, to 4 ESS 210 (block 243). On the other hand, if business 300 is a subscriber to the customer data base key service, NCP 240 checks the ANI of customer 110 with the ANI information stored in data base 280 (block 244). If the ANI of customer 110 is not found, NCP 240 sends an SS7 TCAP message containing routing information for the "800" telephone call, as in the prior art, to 4 ESS 210 (block 245).

However, in accordance with the principles of the invention, if the ANI of customer 110 is found, NCP 240 returns the associated customer account number from data base 280 for customer 110 (using existing data base techniques) along with routing information to 4 ESS 210, via an SS7 TCAP message, (block 246). It can be seen that, in accordance with the principles of the invention, the customer account number can be specified by business 300 so as to be compatible with the computer system used by business 300. In addition, administration and maintenance of a customer's ANI information is now performed by the telecommunications network. Further, by only providing the customer's account number, the privacy of the customer is protected, i.e., business 300 does not, necessarily, have to receive the customer's ANI (which is usually the telephone number of the customer if the customer is calling from his or her residence).

The SS7 TCAP message containing the customer account number, and routing information, is received by 4 ESS 210 (block 213). The customer telephone call, and associated information, now including the customer account number, is then sent by 4 ESS 210 to 4 ESS 220 (e.g., by using ISDN user part of SS7) (block 214). The customer telephone call and associated information is received by 4 ESS 220 (block 221). The customer telephone call is then routed to business 300 over ISDN facility 11 with the customer account number being included in an ISDN, Q.931, SETUP message to business 300 (block 222). Upon answering the telephone call, business 300 receives the Q.931 SETUP message containing the customer account number (block 301).

As was mentioned above, it was assumed that data base 280 in NCP 240 already contained the customer data base keys, e.g., the plurality of account numbers for business 300, where each account number was associated with an ANI of a customer of business 300. However, the initialization of data base 280 can be performed in any number of well-known ways. For example, business 300 can directly access NCP 240 to provide such information to the telecommunications network (e.g., see the above mentioned U.S. Pat. No. 4,611,094, issued to Asmuth et al.), or NCP 240, in conjunction with 4 ESS 210, can initialize data base 280 by prompting the calling party (i.e., customer 110) using currently available voice response technology (e.g., before executing block 245 in the above embodiment, a voice prompt can be provided to customer 110 to either enter their account number for business 300, or to inquire if they wish an account number for business 300 to be assigned, etc.).

In addition to translating the ANI of a calling party within a telecommunications network, FIG. 4 illustrates another communications system, embodying the principles of the invention, where the translation of the customer's ANI is performed outside the telecommunications network by a processing complex.

FIG. 4 is identical to FIG. 1 except for the addition of processor 400, and data base 420. Processor 400 is connected to NCP 240 through path 20 (i.e., processor 400 supports signaling system number 7). Processor 400 is a general purpose computer such as the AT&T 3B/400 (the AT&T 3B computers are generally described in *AT&T Technology Report*, Vol. 3, No. 2 and No. 3, 1988). (It should be noted that processor 400 and/or data base 420 can be accessed in other well-known ways, e.g., through X.25, another 4 ESS, etc.)

Figure 5:
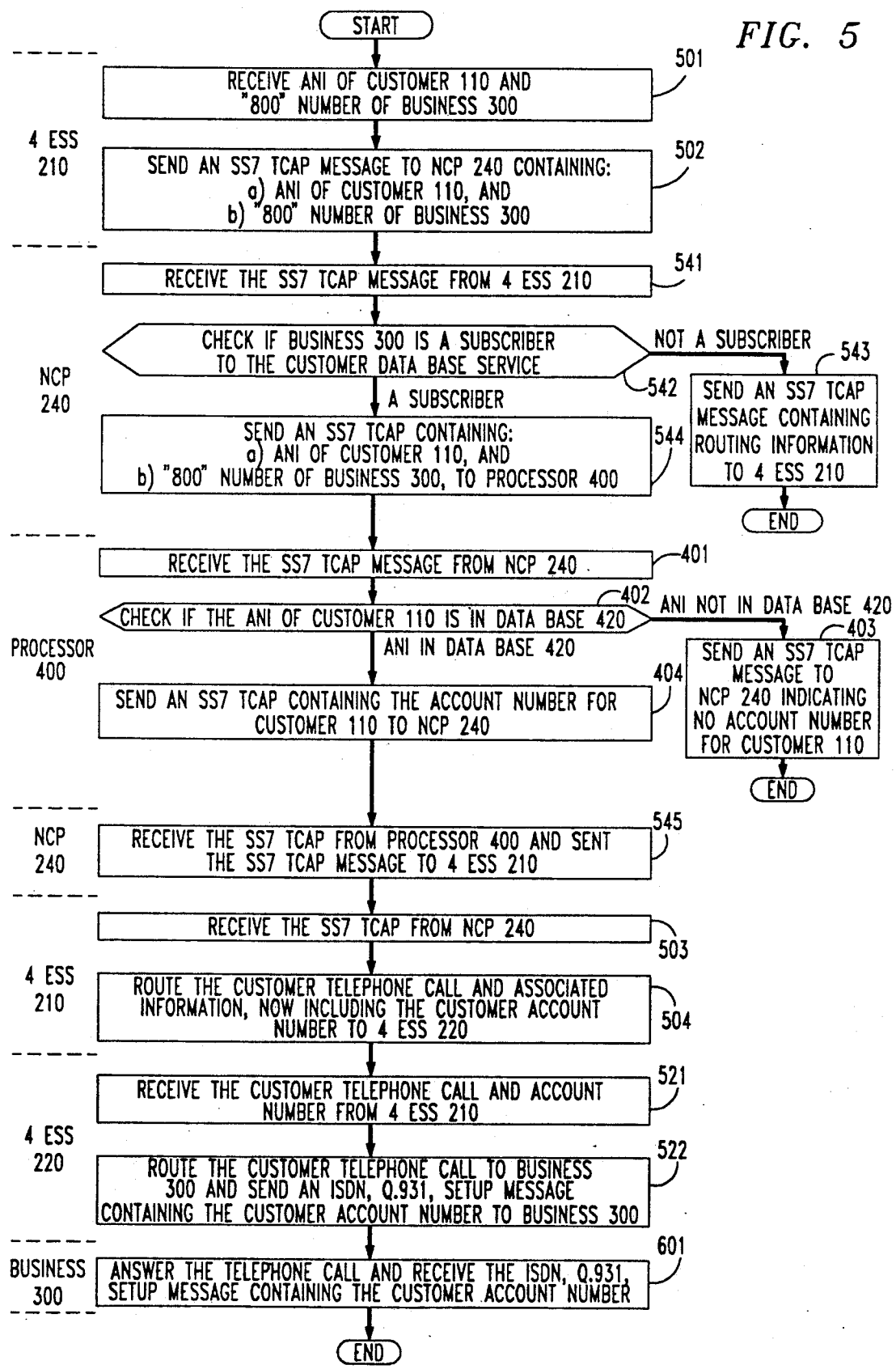
FIG. 5 is a flow diagram of process steps carried out in the communications system of FIG. 4 to implement the invention.

In order to facilitate understanding the inventive concept, reference can also be made to FIG. 5 which represents another illustrative method used herein to process the customer telephone call. As before, a customer at telephone 110, initiates a telephone call with LEC 100 and dials the "800" number of business 300. The telephone call is switched through LEC 100, through path 12, to originating 4 ESS switch 210. As before, 4 ESS switch 210 receives the telephone call from LEC 110 and queries NCP 240 (blocks 501 and 502).

NCP 240 receives the SS7 TCAP message and checks if business 300 is a subscriber to the customer data base service (blocks 541 and 542). If business 300 is not a subscriber to the service, NCP 240 sends an SS7 TCAP message containing routing information to 4 ESS 210 (block 543). However, if business 300 is a subscriber to the customer data base key service, NCP 240 sends and SS7 TCAP message, containing a) the ANI of customer 110, and b) the "800" number of business 300, to processor 400 (block 544).

The SS7 TCAP message, containing the ANI of customer 110 and the "800" number of business 300, is received by processor 400 (block 401). Processor 400 checks the ANI of customer 110 with the ANI information stored in data base 420 (block 402). (It should be noted that the operation of processor 400 is similar to the operation of NCP 240 in the first illustrative embodiment described hereinabove.) The ANI information in data base 240 represents those customers of business 300 which have an account number assigned to them (as described hereinabove). If the ANI of customer 110 is not found, processor 400 sends an SS7 TCAP message to NCP 240 indicating that there is no account number for customer 110 (block 403). (For the purpose of this example, an indication is merely information sent within the SS7 TCAP message, representative of the particular condition).

However, in accordance with the principles of the invention, if the ANI of customer 110 is found, processor 400 returns the associated customer account number from data base 420 for customer 110 (using existing data base techniques) to NCP 240 via an SS7 TCAP message (block 404).

The SS7 TCAP message containing the customer account number is received by NCP 240 and sent to 4 ESS 210 (block 545).

The SS7 TCAP message containing the customer account number is received by 4 ESS 210 (block 503). The customer telephone call, and associated information, now including the customer account number, is then routed to 4 ESS 220 (block 504). The customer telephone call and associated information is received by 4 ESS 220 (block 521). The customer telephone call is then routed to business 300 over ISDN facility 11 with the customer account number being included in an ISDN, Q.931 SETUP message to business 300 (block 522). Upon answering the telephone call, business 300 receives the Q.931 SETUP message containing the customer account number (block 601).

The foregoing merely illustrates the principles of the invention. For example, information can be provided to the business other than an account number, e.g., a social security number. Further, although a customer's identifying ANI information was routed over a simple network configuration using ISDN facilities and translated in a processor complex, it can be appreciated that any other customer-identifying information compatible with a network configuration and CCS scheme can be translated to achieve the same result. Also, other architectural configurations between the processor and the data base may also exist, e.g., the data base can physically be a part of the processor, or be remote from the processor. Additionally, the network configuration used is merely representative, and other network configurations and architectures can be used. For example, other connecting facilities to the business can be used such as a "T1" connection, or a "Basic Rate Interface" (BRI) ISDN facility and "CCIT SS7 signaling" can also be used. Finally, the stored-program-control switches shown were merely to demonstrate the principles of the invention. For example, the translation of a customer's ANI can be done by another 4 ESS switch or a LEC through which the call is routed, and it is not required that the business customer have a PBX. It will, thus, be appreciated that those skilled in the art will be able to devise numerous arrangements, which, although not explicitly shown or described herein, embody the principles of the invention and are within its spirit and scope.

I claim:

1. A method for processing a telephone call between a calling party and a called party in a telecommunications network, the method comprising the steps of:

receiving in a first stored-program-control switch a telephone number of the calling party and a telephone number of the called party;

sending the telephone number of the calling party and the telephone number of the called party from the first stored-program-control switch to a processor;

translating the telephone number of the calling party and the telephone number of the called party in the processor to provide a customer data base key;

sending the customer data base key from the processor to the first stored-program-control switch; and providing the customer data base key from the first stored-program-control switch to the called party.

2. The method of claim 1 wherein the telephone number of the calling party is an —automatic number identification— of the calling party.

3. The method of claim 2 wherein the processor in the translating step is comprised of a data base containing the ANI of the calling party, the telephone number of the called party, and the customer data base key.

4. The method of claim 1 wherein the processor in the translating step is a network control point of the telecommunications network.

5. The method of claim 1 wherein the step of sending the telephone number of the calling party includes the step of sending an SS7 TCAP message containing the telephone number of the calling party and the telephone number of the called party.

6. The method of claim 1 wherein the step of providing includes the step of sending an ISDN, Q.931, SETUP message to the called party containing the customer data base key.

7. The method of claim 1 wherein the step of providing includes the steps of:

sending the customer data base key from the first stored-program-control switch to a second stored-program-control switch; and providing the customer data base key from the second stored-program-control switch to the called party.

8. Apparatus for processing a telephone call between a calling party and a called party, the apparatus —comprising—:

network means responsive to the telephone call for providing an —automatic number identification— of the calling party and a telephone number of the called party; and processing means for —checking— the —automatic number identification— of the calling party and the telephone number of the called party—in a data base— and for providing a customer data base key;

said network means being further responsive to the customer data base key received from the processing means for providing said customer data base key to the called party.

9. The apparatus of claim 8 wherein the customer data base key is predetermined by the called party.

10. The apparatus of claim 9 wherein the customer data base key is an account number of the calling party.

11. The apparatus of claim 8 wherein the network means provides the ANI of the calling party and the telephone number of the called party in an SS7 TCAP message.

12. The apparatus of claim 8 wherein the network means provides the customer data base key to a called party in an ISDN, Q.931, SETUP message.

13. The apparatus of claim 8 wherein the network means is a plurality of stored-program-control switches.

14. The apparatus of claim 8 wherein the network means is a single stored-program-control switch.

15. The apparatus of claim 8 wherein the processor means is a network control point.

* * * * *